United States Patent
Senoue et al.

(10) Patent No.: US 10,041,561 B2
(45) Date of Patent: Aug. 7, 2018

(54) SPRING ASSEMBLY AND DAMPER DEVICE INCLUDING SPRING ASSEMBLY

(71) Applicant: EXEDY Corporation, Neyagawa-shi, Osaka (JP)

(72) Inventors: Takeshi Senoue, Neyagawa (JP); Masahiro Nakatani, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 0 days.

(21) Appl. No.: 15/435,587

(22) Filed: Feb. 17, 2017

(65) Prior Publication Data
US 2017/0268590 A1    Sep. 21, 2017

(30) Foreign Application Priority Data
Mar. 18, 2016 (JP) ................. 2016-055312

(51) Int. Cl.
| | |
|---|---|
| *F16F 1/04* | (2006.01) |
| *F16F 15/123* | (2006.01) |
| *F16F 1/02* | (2006.01) |
| *F16D 3/12* | (2006.01) |
| *F16D 13/64* | (2006.01) |
| *F16D 13/68* | (2006.01) |

(52) U.S. Cl.
CPC .......... *F16F 15/12346* (2013.01); *F16D 3/12* (2013.01); *F16F 1/025* (2013.01); *F16F 1/047* (2013.01); *F16D 13/64* (2013.01); *F16D 13/68* (2013.01); *F16F 2234/00* (2013.01)

(58) Field of Classification Search
CPC ..... F16D 3/12; F16F 1/025; F16F 1/04; F16F 1/42; F16F 1/043; F16F 1/047; F16F 1/048; F16F 1/08; F16F 1/10; F16F 3/04; F16F 15/12306; F16F 15/12346; F16F 15/13407; F16F 15/13461; F16F 2234/00; F16F 2236/08
USPC ................................ 464/68.8, 68.9
See application file for complete search history.

(56) References Cited

U.S. PATENT DOCUMENTS

| | | | | |
|---|---|---|---|---|
| 71,169 | A * | 11/1867 | Hayward | A47C 23/0438 5/256 |
| 176,174 | A * | 4/1876 | French | B60G 11/16 267/286 |
| 274,715 | A * | 3/1883 | Buckley | F16F 1/04 213/40 S |

(Continued)

FOREIGN PATENT DOCUMENTS

| | | | | |
|---|---|---|---|---|
| FR | 508271 A | * | 10/1920 | ............. F16F 1/043 |
| JP | 2004183871 A | | 7/2004 | |
| WO | WO 2006101381 A1 | * | 9/2006 | ............. F16F 1/08 |

*Primary Examiner* — Josh Skroupa
(74) *Attorney, Agent, or Firm* — United IP Counselors, LLC

(57) ABSTRACT

A spring assembly includes a first coil spring and a second coil spring. The second coil spring includes a first winding portion and a second winding portion. The first winding portion includes a plurality of windings from a first winding to at least a second winding. The second winding portion is a portion except for the first winding portion. An outer diameter of each of the plurality of windings of the first winding portion is smaller than an outer diameter of each of at least one winding of the second winding portion. Each of the plurality of windings of the first winding portion includes the substantially same outer diameter.

7 Claims, 4 Drawing Sheets

(56) References Cited

U.S. PATENT DOCUMENTS

| | | | | |
|---|---|---|---|---|
| 4,017,062 A * | 4/1977 | Zwirner | ............... | F16F 1/047 |
| | | | | 267/166 |
| 4,120,489 A * | 10/1978 | Borlinghaus | ............. | F16F 1/08 |
| | | | | 267/166 |
| 4,351,168 A * | 9/1982 | Prince | .............. | F16F 15/12346 |
| | | | | 464/68.92 |
| 4,892,008 A * | 1/1990 | Naudin | ............ | F16F 15/12346 |
| | | | | 464/68.8 |
| 5,246,215 A * | 9/1993 | Takamura | ............... | F01L 1/462 |
| | | | | 267/170 |
| 5,401,213 A * | 3/1995 | Muchmore | ........... | F16F 15/129 |
| | | | | 464/64.1 |
| 5,551,674 A * | 9/1996 | Johnsen | .................... | F16F 1/04 |
| | | | | 267/168 |
| 7,192,354 B2 * | 3/2007 | Uehara | ............... | F16F 15/1292 |
| | | | | 188/83 |
| 7,993,244 B2 * | 8/2011 | Weller | .................... | A63B 5/08 |
| | | | | 482/23 |
| 8,061,696 B2 * | 11/2011 | Liu | ........................ | B60G 11/14 |
| | | | | 267/166 |
| 8,317,627 B2 * | 11/2012 | Kombowski | ....... | F16F 15/1234 |
| | | | | 464/68.1 |
| 2010/0130289 A1 * | 5/2010 | Uehara | ................ | F16D 13/644 |
| | | | | 464/68.8 |
| 2017/0102037 A1 * | 4/2017 | Davis | ...................... | F16F 1/047 |

* cited by examiner

SPRING ASSEMBLY AND DAMPER DEVICE INCLUDING SPRING ASSEMBLY

CROSS-REFERENCE TO RELATED APPLICATIONS

This application claims priority to Japanese Patent Application No. 2016-055312 filed on Mar. 18, 2016, the entirety of which is hereby incorporated by reference in its entirety.

BACKGROUND

Technical Field

The present disclosure relates to a spring assembly, particularly to a spring assembly and a damper device for absorbing and attenuating torsional vibration.

Background Information

In vehicles, spring assemblies are installed in a damper mechanism for, e.g., a clutch disc assembly, a flywheel assembly, a lock-up clutch for a torque converter, etc., so as to absorb and attenuate torsional vibration.

The spring assemblies are configured to elastically couple an input-side rotary member and an output-side rotary member in a circumferential direction. When the input-side rotary member and the output-side rotary member are rotated relatively to each other, the spring assemblies are configured to be compressed between the input-side rotary member and the output-side rotary member in a rotational direction. In this state, torsional vibration inputted into the input-side rotary member is absorbed and attenuated by the spring assemblies.

As an example of the spring assembly described above, there has been known a spring assembly including two coil springs on which one being nested in the other (see Japan Laid-open Patent Application Publication No. 2004-183871). The spring assembly includes an outer coil spring (a first coil spring) and an inner coil spring (a second coil spring). The inner coil spring is shorter than the outer coil spring and is disposed in the interior of the outer coil spring.

In the above conventional spring assembly, when the outer coil spring expands and contracts, and the inner coil spring doesn't expand and contract, the inner coil spring is movable on an inner peripheral side of the outer coil spring in a circumferential direction. In this state, when centrifugal force acts on the inner coil spring, the inner coil spring is in contact with an inner peripheral surface of the outer coil spring and slides on the inner peripheral surface in the circumferential direction.

There is possibility that an end portion of the inner coil spring abuts against a coil wire of the outer coil spring, and/or invades a gap between windings of the outer coil spring, while the inner coil spring slides on the inner peripheral surface of the outer coil spring.

To address these problems, there was an attempt to use a barrel-shaped inner coil spring. In this case, the above problems can be alleviated, but a new problem was caused by forming the inner coil spring in a barrel shape.

The problem is that an endmost winding (a first winding) of an end of the inner coil spring intrudes inside a second winding adjacent to the endmost winding, for example, when the end portion of the inner coil spring abuts against the outer coil spring and/or invades the outer coil spring.

In this case, it is likely that compressive strength of the inner coil spring can't achieve a desired compressive strength of the inner coil spring which a designer desires, because unanticipated bending stress generates in the end of the inner coil spring.

It is an object of the present disclosure to improve a durability of a second coil spring disposed on the inner peripheral side of a first coil spring.

BRIEF SUMMARY (1) A spring assembly according to an aspect of the present disclosure is a spring assembly for absorbing and attenuating torsional vibration. The spring assembly comprises a first coil spring and a second coil spring. The second coil spring is disposed on the inner peripheral side of the first coil spring. The second coil spring is configured to be shorter than the first coil spring.

The second coil spring includes a first winding portion and a second winding portion. The first winding portion includes a plurality of windings from a first winding to at least a second winding. The first winding is an endmost winding on each of the both ends of the second coil spring. The second winding is adjacent to the first winding. The second winding portion is a portion except for the first winding portion. The second winding portion includes at least one of winding.

An outer diameter of each of the plurality of windings of the first winding portion is smaller than an outer diameter of each of the at least one of winding of the second winding portion. Each of the plurality of windings of the first winding portion includes the substantially same outer diameter.

In the spring assembly, the plurality of windings of the first winding portion of the second coil spring are prevented from mutually intruding inside thereof by forming each of the plurality of windings of the first winding portion at the substantially same outer diameter, even if the first winding portion interferes with the first coil spring. Herewith, a durability of the second coil spring can be improved.

(2) A spring assembly according to another aspect of the present disclosure is preferably configured so that the outer diameter of each of the plurality of windings of the first winding portion is larger than an inner diameter of a winding of the second winding portion adjacent to the first winding portion.

In the spring assembly, the plurality of windings of the first winding portion of the second coil spring are prevented from intruding inside the winding of the second winding portion. Herewith, a durability of the second coil spring can be improved.

(3) A spring assembly according to another aspect of the present disclosure is preferably configured so that an outer diameter of each of the plurality of windings of the first winding portion is larger than an inner diameter of each of a plurality of windings of the second winding portion.

In the spring assembly, the plurality of windings of the first winding portion of the second coil spring are prevented from intruding inside the windings of the second winding portion. Herewith, a durability of the second coil spring can be improved.

(4) A spring assembly according to another aspect of the present disclosure is preferably configured so that the first winding portion is a small diameter portion. The second winding portion is a large diameter portion and a pair of middle diameter portions. The large diameter portion is provided between a pair of the small diameter portions. The large diameter portion includes an outer diameter larger than the small diameter portion. The pair of middle diameter portions is respectively provided between the large diameter portion and each of the pair of small diameter portions.

In the spring assembly, the plurality of windings of the first winding portion are prevented from mutually intruding inside thereof by this configuration. Herewith, a durability of the second coil spring can be improved.

(5) A spring assembly according to another aspect of the present disclosure is preferably configured so that an outer diameter of each of windings of the middle diameter portion is gradually reduce from the large diameter portion toward the small diameter portion. Herewith, the second coil spring can be smoothly worked on the inner peripheral side of the first coil spring.

(6) A spring assembly according to another aspect of the present disclosure is preferably configured so that the outer diameter of the large diameter portion is substantially constant. Herewith, stiffness of the second coil spring can be stably secured.

(7) A damper device according to an aspect of the present disclosure is a damper device for absorbing and attenuating torsional vibration. The damper device comprises an input rotary member, an output rotary member, and a spring assembly as previously described. The output rotary member is configured to rotate with respect to the input rotary member. The spring assembly elastically couples the input rotary member with the output rotary member in a rotational direction.

In the damper device, if the spring assembly works when the input rotary member and the output rotary member are relatively rotate each other, effects similar to the above can be obtained, because the damper device includes the spring assembly as previously described.

In the present disclosure, a durability of a second coil spring, which is disposed on the inner peripheral side of a first coil spring, can be improved.

Referring now to the attached drawings, which form a part of this original disclosure:

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiment

<Configuration of a Damper Device>

Figure 1:
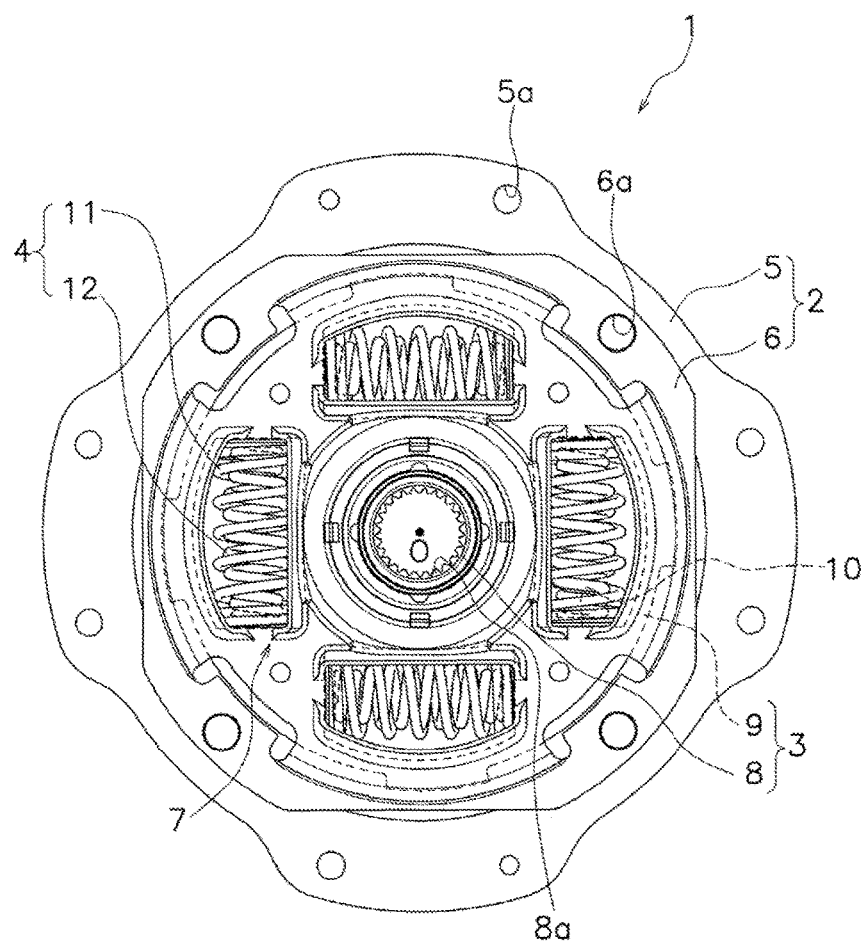
FIG. 1 is a front view of a damper device according to an embodiment of the present disclosure.

FIG. 1 shows a front view of a damper device 1 according to an embodiment of the present disclosure. As shown in FIG. 1, the damper device 1 is disposed between an engine (not shown) and a transmission (not shown).

Reference characters "O" in FIG. 1 indicates a rotational axis of the damper device 1.

A direction away from the rotational axis O is described as a radial direction. A direction around the rotational axis O is described as a circumferential direction or a rotational direction. A direction along the rotational axis O is described as a circumferential direction or a axial direction. Also, a direction along a coil axis C of a second coil spring of a spring assembly is described as a coil axis direction.

The damper device 1 is configured to absorb and attenuate torsional vibration. As shown in FIG. 1, the damper device 1 includes an input rotary member 2, an output rotary member 3, and a plurality of spring assemblies 4. In the embodiment, the plurality of spring assemblies 4 include four spring assemblies.

The power from the engine is transmitted to the input rotary member 2. The power includes a torque fluctuation. The input rotary member 2 includes a first input plate 5 and a pair of second input plates 6.

The first input plate 5 is formed in a substantially annular shape. The first input plate 5 is disposed between the pair of the second input plates 6 in the axial direction. The first input plate 5 is fixed to a flywheel (not shown) by a fixing means, for example, bolts (not shown) via fixing holes 5a of the first input plate 5.

Each of the pair of second input plates 6 is disposed on the both sides of the first input plate 5 in the axial direction. In this state, an outer peripheral portion of each of the second input plates 6 is fixed to an inner peripheral portion of the first input plate 5 by a fixing means, for example, bolts (not shown) via fixing holes 6a of the first input plate 5. Thus, the pair of second input plates 6 are configured to rotate integrally with the first input plate 5.

Each of the second input plates 6 includes a plurality of first spring windows 7, for example, four first spring windows 7. The spring assembly 4 is disposed in each of the first spring windows 7. Each of the first spring windows 7 is disposed at a predetermined interval in the circumferential direction. In the embodiment, the first spring windows 7, for example, the four first spring windows 7 are respectively provided at an interval of 90 degrees with respect to the rotational axis O.

The output rotary member 3 outputs the power of the engine to the transmission. The output rotary member 3 is configured to rotate relatively with respect to the input rotary member 2. Specifically, the output rotary member 3 is configured to rotate relatively with respect to the input rotary member 2 via the spring assembly 4.

The output rotary member includes an output hub 8 and an output plate 9. The output hub 8 is fixed to an output shaft (not shown) which is attached to the transmission. Specifically, a plurality of teeth portions 8a is formed on the inner peripheral portion of the output hub 8. The plurality of teeth portions 8a engage with the output shaft with a spline engagement.

The output plate 9 is integrally formed on the outer peripheral portion of the output hub 8. The output plate 9 may be formed independently of the output hub 8. In this case, for example, the output plate 9 is attached to the output hub 8 with a spline engagement.

The output plate 9 is formed in a substantially annular shape (see a broken line in FIG. 1). The output plate 9 is disposed between the pair of second input plates 6 in the axial direction. The output plate 9 includes a plurality of second spring windows 10, for example, four second spring windows 10.

The spring assembly 4 is disposed in each of the second spring windows 10. Each of the second spring windows 10 is disposed at a predetermined interval in the circumferential direction. In the embodiment, the second spring windows, for example, the four second spring windows 10 are respectively provided at an interval of 90 degrees with respect to the rotational axis O. Each of the second spring windows 10 is disposed opposed to each of the first spring windows 7 in the axial direction.

The plurality of spring assemblies 4 are configured to elastically couple the input rotary member 2 with the output rotary member 3 in the rotational direction.

Each of the spring assemblies 4 is disposed in each of the first spring windows 7 of the input rotary member 2 (the first and second input plates 5, 6) and each of the second spring windows 10 of the output rotary member 3 (the output plate 9).

Each of the spring assemblies 4 includes a first coil spring 11 and the second coil spring 12. The first coil spring 11 is disposed in each of the first and second spring windows 7, 10.

The first coil spring 11 abuts on a pair of wall portions of each of the first and second spring windows 7, 10, the pair of wall portions being opposed to each other on each of the first and second spring windows 7, 10 in the circumferential direction.

In this state, when the input rotary member 2 and the output rotary member 3 relatively rotate each other, one end of the first coil spring 11 is pressed by the wall portions of the pair of first spring windows 7, and the other end of the first coil spring 11 is pressed by the wall portion of the second spring windows 10. Thus, the first coil spring 11 operates.

The second coil spring 12 is disposed on an inner peripheral side of the first coil spring 11. An axial length L12 (e.g. a natural length) of the second coil spring 12 is shorter than an axial length L11 (e.g. a natural length) of the first coil spring 11. The axial length of each of the first and second coil springs 11, 12 is a length thereof in the coil axis direction.

In a state that the second coil spring 12 doesn't operate, the second coil spring 12 is movable on an inner peripheral side of the first coil spring 11 in the circumferential direction, for example, in the coil axis direction of the first coil spring 11.

When a torsional angle between the input rotary member 2 and the output rotary member 3 reaches a predetermined torsional angle, the second coil spring 12 abuts against the pair of wall portions which are opposed to each other on each of the first and second spring windows 7, 10 in the circumferential direction.

Then, one end of the second coil spring 12 is pressed by the wall portions of the pair of first spring windows 7, and the other end of the second coil spring 12 is pressed by the wall portion of the second spring windows 10. Thus, the second coil spring 12 operates.

Figure 2:
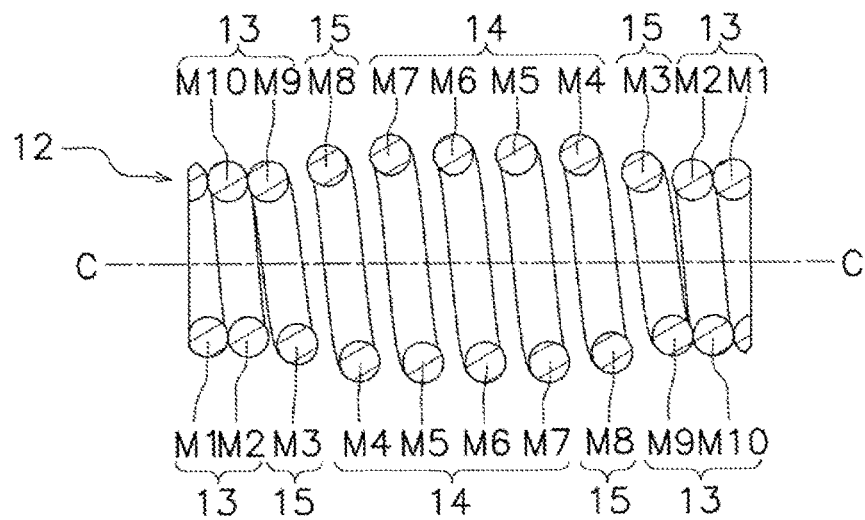
FIG. 2 is a cross-sectional view of a second coil spring of a spring assembly according to the embodiment.
Figure 3:
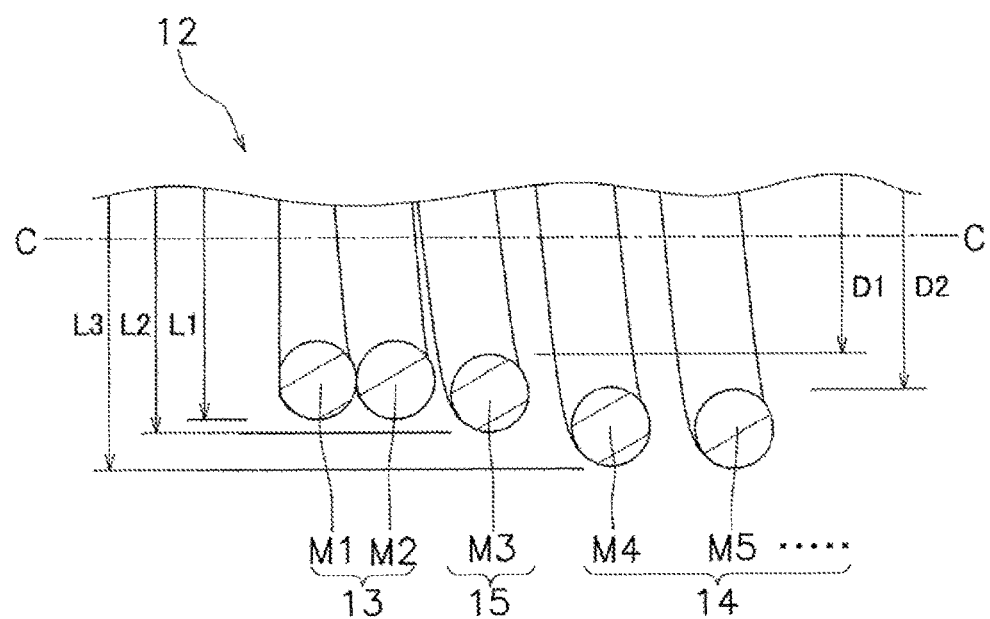
FIG. 3 is a partially enlarged cross-sectional view of the second coil spring of a spring assembly according to the embodiment.
Figure 4:
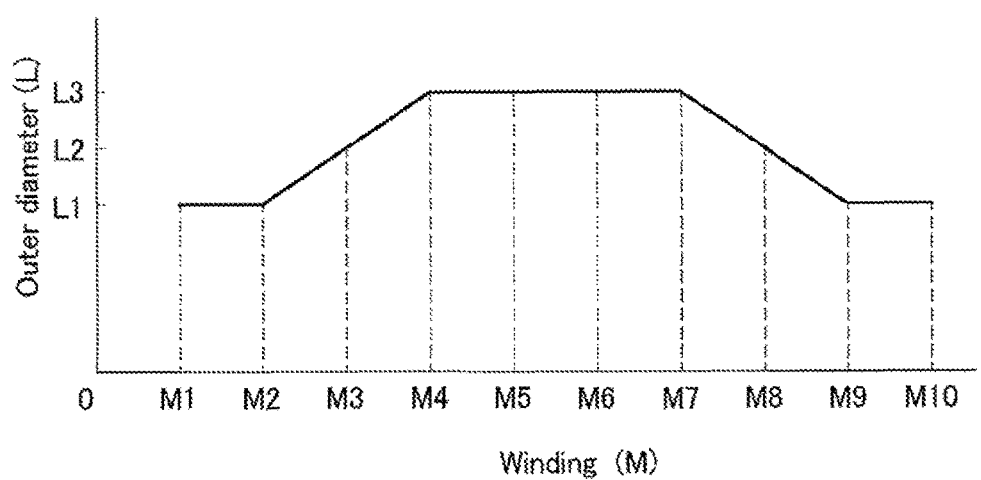
FIG. 4 is a diagram indicating relationship between windings and an outer diameter of the second coil spring.

As shown in FIGS. 2 to 4, the second coil spring 12 includes a small diameter portion 13 (an example of a first winding portion), a large diameter portion 14 (an example of a second winding portion), and a middle diameter portion 15 (an example of a second winding portion).

Specifically, the second coil spring 12 includes a pair of the small diameter portions 13, the large diameter portion 14, and a pair of the middle diameter portions 15.

Each of the small diameter portions 13 includes a plurality of windings from an first winding M1 to at least a second winding M2. The first winding M1 is an endmost winding on each of the both ends of the second coil spring 12. The second winding M2 is adjacent to the first winding M1. The large diameter portion 14 and the middle diameter portions 15 are portions which are provided by excluding the small diameter portions 13 from the second coil spring 12.

Reference characters "M1-M10" on upper side of FIG. 2 indicates the plurality of windings, in case that the first winding M1 is a right endmost winding of the second coil spring 12 in the coil axis direction. Also, reference characters "M1-M10" on lower side of FIG. 2 indicates the plurality of windings, in case that the first winding M1 is a left endmost winding of the second coil spring 12 in the coil axis direction.

Specifically, each of the small diameter portions 13 includes the first winding M1 and the second winding M2. The outer diameter L1 of each of the windings of the small diameter portions 13, for example, the outer diameter L1 of the first and second windings M1, M2 is substantially constant. The outer diameter L1 of each of the windings M1, M2 of the small diameter portions 13 is smaller than the outer diameter L3, L2 of each of the windings M3-M7 of the large diameter portion 14 and the middle diameter portions 15.

The outer diameter L1 of each of the windings M1, M2 of the small diameter portions 13 is larger than an inner diameter D1 of a winding M3 adjacent to the small diameter portions 13. For example, the outer diameter L1 of each of the first and second windings M1, M2 is larger than the inner diameter D1 of a third winding M3 of the middle diameter portions 15. Also, the outer diameter L1 of each of the first and second windings M1, M2 is larger than an inner diameter D2 of the large diameter portion 14.

As shown in FIGS. 2 to 4, the large diameter portion 14 is provided between the pair of the small diameter portions 13 in the coil axis direction. The large diameter portion 14 includes an outer diameter L3 larger than the small diameter portions 13. In other words, the outer diameter L3 of each of the windings M4-M7 of the large diameter portion 14 is larger than the outer diameter L1 of each of the small diameter portions 13. The outer diameter L3 of each of the windings M4-M7 of the large diameter portion 14 is substantially constant.

As shown in FIGS. 2 to 4, each of the pair of middle diameter portions 15 is respectively provided between the large diameter portion 14 and each of the pair of small diameter portions 13 in the coil axis direction. Each of the middle diameter portions 15 includes an outer diameter L2 which is smaller than the large diameter portion 14 and is larger than the small diameter portion 13.

Specifically, a winding of the middle diameter portions 15, for example, the third winding M3 interlinks the second winding M2 and the fourth winding M4. The outer diameter L2 of the winding M3 of the middle diameter portion 15, for example, the outer diameter L2 of the third winding M3 is smaller than the outer diameter L3 of each of the fourth to seventh windings M4-M7. The outer diameter L2 of the third winding M3 is larger than the outer diameter L1 of each of the first and second windings M1, M2. In other words, the outer diameter L2 of each of the middle diameter portion 15 is gradually reduce from the large diameter portion 14 toward each of the small diameter portions 13 (see FIG. 4).

Figure 5:
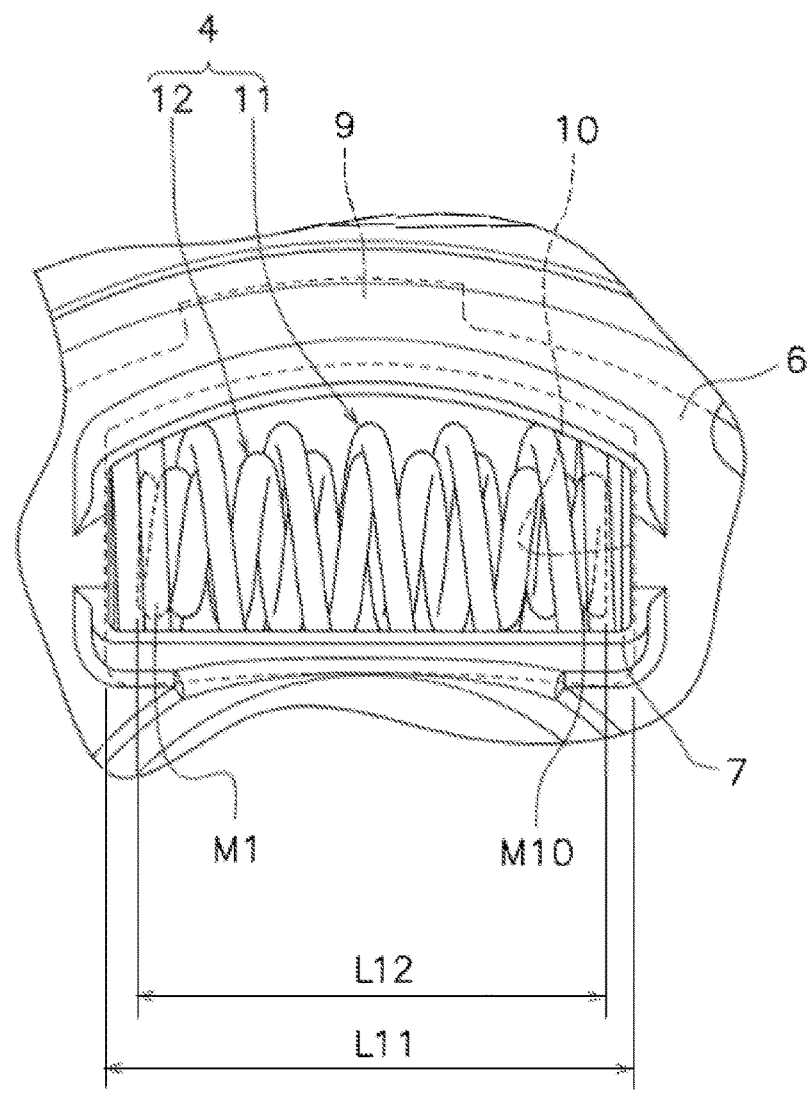
FIG. 5 is an enlarged front view of a damper device according to an embodiment of the present disclosure.

FIG. 5 is an enlarged front view of a damper device according to an embodiment of the present disclosure. As illustrated in FIG. 5, an axial length (e.g. a natural length) of the second coil spring 12 is shorter than an axial length (e.g. a natural length) of the first coil spring 11.

<Operation and Effects of a Spring Assembly>

Operation of the spring assembly will be described below.

Firstly, when the input rotary member 2 and the output rotary member 3 relatively rotate and the torque fluctuation is input to the input rotary member 2, the first coil spring 11 of each of the spring assemblies 4 expands and contracts by the torque fluctuation. Then, the second coil spring 12, which is disposed on the inner peripheral side of the first coil spring 11, moves outward in the radial direction by the centrifugal force. And the second coil spring 12 contacts the inner peripheral surface of the first coil spring 11 and slides on the inner peripheral surface of the first coil spring 11.

In this state, at least one of the small diameter portions 13 of the second coil spring 12 may interfere with the first coil spring 11, and the first winding M1 may intrude inside the second winding M2 on the small diameter portion 13.

But, in the spring assemblies 4, the above problem can be solved because the outer diameter L1 of the windings M1, M2 of each of the small diameter portions 13, for example, the outer diameter L1 of the first and second windings M1, M2 is substantially constant.

Also, the outer diameter L1 of the windings M1, M2 of each of the small diameter is larger than the inner diameter D1 of a winding M3 adjacent to each of the small diameter portions 13. For example, the outer diameter L1 of the first and second windings M1, M2 is larger than the inner diameter D1 of a third winding M3.

Also, the outer diameter L1 of the windings M1, M2 of each of the small diameter, for example, the outer diameter L1 of the first and second windings M1, M2 is larger than the inner diameter D2 of the fourth to seventh windings M4-M7 of the large diameter portion 14.

This configuration prevents the small diameter portion 13 from intruding inside each of the middle diameter portions 15 and/or the large diameter portion 14.

Secondary, when the relative rotation of the input rotary member 2 and the output rotary member 3 further increases, the second coil spring 12, which is disposed on the inner peripheral side of the first coil spring 11, expands and contracts with the first coil spring 11.

In this case, for example, impact force may be added to the both ends (the small diameter portion 13) of the second coil spring 12 when the torque fluctuation is input. Then, the first winding M1 may intrude inside the second winding M2 on the small diameter portion 13 and the small diameter portion 13 may intrude inside each of the middle diameter portions 15 and/or the large diameter portion 14. But this problem can be solved by the above configuration.

In other words, a durability of the second coil spring 12 can be improved by configured each of the spring assemblies 4 as stated above Other Embodiment The preferred embodiments of the present disclosure have been described above. However, specific constructions are not limited to those described in the aforementioned preferred embodiments, and a variety of changes can be made without departing from the scope of the present disclosure.

(A) In the above embodiment, explanation is performed as an example that the small diameter portion 13 includes the first and second windings M1, M2. Instead of this, the small diameter portion 13 can include three and more windings.

(B) In the above embodiment, explanation is performed as an example that the middle diameter portion 15 includes a single winding (the third winding M3).

Instead of this, the middle diameter portion 15 can include a plurality of windings. In this case, the middle diameter portion 15 is configured so that the outer diameter L2 of each of the plurality of windings gradually reduces from the large diameter portion 14 toward each of the small diameter portions 13.

(C) In the above embodiment, explanation is performed as an example that the spring assembly 4 is applied to the damper device 1. Instead of this, the spring assembly 4 can be applied to the other device, for example, a rock-up device and the like.

(d) In the above embodiment, explanation is performed as an example that each of middle diameter portions 15 is respectively provided between the large diameter portion 14 and each of the pair of small diameter portions 13. Instead of this, the spring assembly 4 can include the small diameter portions 13 and the large diameter portion 14 without the middle diameter portions 15.

What is claimed is:

1. A spring assembly for absorbing and attenuating torsional vibration, the spring assembly comprising:
    a first coil spring; and
    a second coil spring disposed on an inner peripheral side of the first coil spring and shorter than the first coil spring; wherein
    the second coil spring includes a first winding portion and a second winding portion, the first winding portion including a plurality of windings from a first winding to at least a second winding, the first winding being an endmost winding on each of both ends of the second coil spring, the second winding adjacent to the first winding, the second winding portion being a portion except for the first winding portion and including at least one winding; and
    an outer diameter of each of the plurality of windings of the first winding portion is smaller than an outer diameter of each of the at least one winding of the second winding portion, the outer diameter of each of the plurality of windings of the first winding portion is larger than an inner diameter of a winding of the second winding portion adjacent to the first winding portion, and each of the plurality of windings of the first winding portion includes the same outer diameter.

2. The spring assembly according to claim 1, wherein the outer diameter of each of the plurality of windings of the first winding portion is larger than the inner diameter of each of a plurality of windings of the second winding portion.

3. The spring assembly according to claim 1, wherein the first winding portion is a small diameter portion, the second winding portion is a large diameter portion and a pair of middle diameter portions, the large diameter portion provided between a pair of the small diameter portions and including an outer diameter larger than the small diameter portion, the pair of middle diameter portions respectively provided between the large diameter portion and each of the pair of small diameter portions.

4. The spring assembly according to claim 3, wherein an outer diameter of each of windings of the middle diameter portion is gradually reduced from the large diameter portion toward the small diameter portion.

5. The spring assembly according to claim 3, wherein the outer diameter of the large diameter portion is substantially constant.

6. A damper device for absorbing and attenuating torsional vibration, the damper device comprising:
    an input rotary member;
    an output rotary member configured to rotate with respect to the input rotary member; and
    the spring assembly recited in claim 1, the spring assembly elastically coupling the input rotary member and the output rotary member in a rotational direction.

7. The spring assembly according to claim 1, wherein the second coil spring is configured to move in the first coil spring.

* * * * *